US012624610B2

(12) United States Patent
Garibay et al.

(10) Patent No.: US 12,624,610 B2
(45) Date of Patent: May 12, 2026

(54) INTEGRATED COMPOSITE SEALS FOR RAM BODY

(71) Applicant: Hydril USA Distribution LLC, Houston, TX (US)

(72) Inventors: Manuel Garibay, Houston, TX (US); Michael Denk, Houston, TX (US); Joseph Incavo, Houston, TX (US); Justin Fenske, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 0 days.

(21) Appl. No.: 18/562,637

(22) PCT Filed: May 17, 2022

(86) PCT No.: PCT/US2022/072372
§ 371 (c)(1),
(2) Date: Nov. 20, 2023

(87) PCT Pub. No.: WO2022/246403
PCT Pub. Date: Nov. 24, 2022

(65) Prior Publication Data
US 2024/0271502 A1 Aug. 15, 2024

Related U.S. Application Data

(63) Continuation of application No. 17/324,902, filed on May 19, 2021, now abandoned.

(51) Int. Cl.
*E21B 33/06* (2006.01)
*F16J 15/3284* (2016.01)
(52) U.S. Cl.
CPC ......... *E21B 33/062* (2013.01); *F16J 15/3284* (2013.01)

(58) Field of Classification Search
CPC ........................... E21B 33/062; F16J 15/3284
See application file for complete search history.

(56) References Cited

U.S. PATENT DOCUMENTS 4,332,367 A 6/1982 Nelson
4,647,002 A * 3/1987 Crutchfield ........... E21B 33/062
251/1.3
(Continued)

FOREIGN PATENT DOCUMENTS

CN 101517284 A 8/2009
CN 201474651 U 5/2010
(Continued)

OTHER PUBLICATIONS

International Search Report and Written Opinion in corresponding International Application No. PCT/US2022/072372, dated Sep. 7, 2022 (8 pages).
(Continued)

*Primary Examiner* — Nicole Coy
*Assistant Examiner* — Nicholas D Wlodarski
(74) *Attorney, Agent, or Firm* — Osha Bergman Watanabe & Burton LLP

(57) ABSTRACT

A seal in a ram body includes an integrated structure of a first composite material having at least one channel and a second composite material within such at least one channel, which in turn allows movement therethrough of such a second composite material during energizing of a ram body and which allows return of such a second composite material to, at least in part, an integrated structure of such a seal so that such a seal remains reusable.

20 Claims, 6 Drawing Sheets

(56)          References Cited

U.S. PATENT DOCUMENTS

| | | | |
|---|---|---|---|
| 6,394,460 | B1 | 5/2002 | Leggett et al. |
| 10,221,646 | B2 | 3/2019 | Sedens et al. |
| 2017/0204695 | A1* | 7/2017 | Bodhayan ............... B29C 73/22 |
| 2018/0274322 | A1* | 9/2018 | Gamble ................ F16K 3/0227 |

FOREIGN PATENT DOCUMENTS

| | | |
|---|---|---|
| CN | 205677576 U | 11/2016 |
| CN | 110462162 A | 11/2019 |

OTHER PUBLICATIONS

Office Action issued in corresponding China Application No. 202280035746.9, dated Mar. 3, 2026. (18 pages).

* cited by examiner

300

302
304
306

400

402
404A
400B
404B 408
410
416A
416B  412

402
414B
414A
406

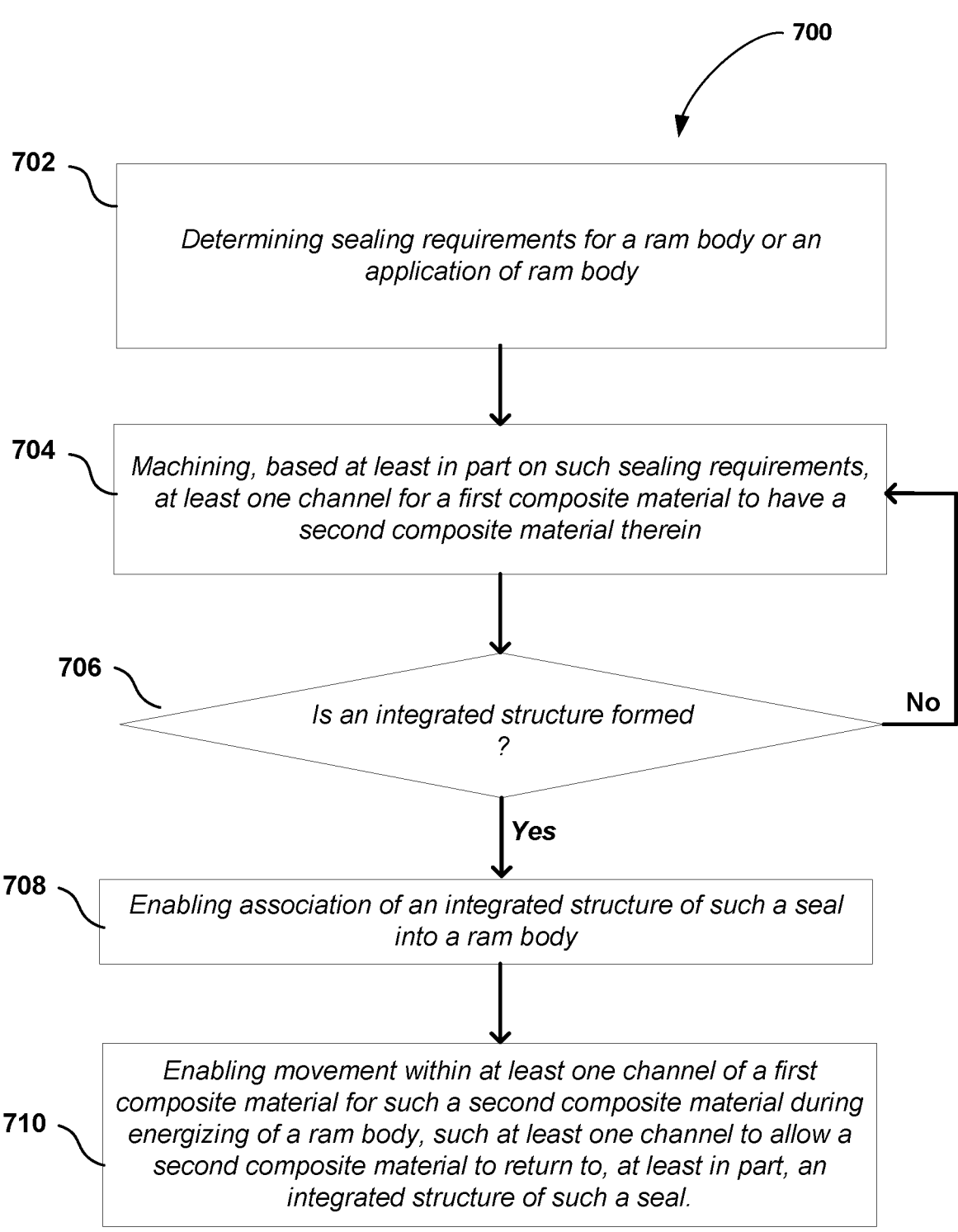

700

702 — Determining sealing requirements for a ram body or an application of ram body

704 — Machining, based at least in part on such sealing requirements, at least one channel for a first composite material to have a second composite material therein

706 — Is an integrated structure formed ?

No

Yes

708 — Enabling association of an integrated structure of such a seal into a ram body

710 — Enabling movement within at least one channel of a first composite material for such a second composite material during energizing of a ram body, such at least one channel to allow a second composite material to return to, at least in part, an integrated structure of such a seal.

FIG. 7

INTEGRATED COMPOSITE SEALS FOR RAM BODY

BACKGROUND

1. Field of Invention

This invention relates in general to equipment used in the hydrocarbon industry, and in particular, to a seal for a ram body that has an integrated structure.

2. Description of the Prior Art

A drilling well is a structure formed in subterranean or underwater geologic structures, or layers. Such subterranean or underwater geologic structures or layers incorporate pressure that may be further enhanced by supplementing formation fluids (such as liquids, gasses or a combination) into a drill site or a well site (such as a wellbore). Such pressure may extend to an entry point of a drill site from a subterranean or underwater geologic structures, represents a blowout in a well site and, and presents an issue that is to be addressed to keep terranean drill equipment and a well site safe. A blowout may otherwise cause catastrophic damage. A blow out preventer or BOP may be installed above a wellhead at a surface or sea floor to seal or control a subterranean or underwater geologic structures. Annular or ram-type blowout preventers may include a ram body as part of such a feature provided for a wellhead.

SUMMARY

In at least one embodiment, a seal for a ram body and a methods associated with such a seal address shortcomings previously identified.

Such a seal may include an integrated structure of a first composite material and a second composite material. The first composite material may include at least one channel and may include the second composite material within the at least one channel. The at least one channel is adapted to allow movement therethrough of such second composite material during energizing of a ram body and to allow return of the second composite material to, at least in part, an integrated structure so formed.

In at least one embodiment, a method for a seal of a ram body includes aspects for manufacture or for sealing. An aspect of the method includes forming an integrated structure of a first composite material and a second composite material. The integrated structure formed is so that the first composite material includes at least one channel and includes the second composite material within the at least one channel. One aspect of the method includes enabling movement, within the at least one channel of the first composite material, for the second composite material during energizing of a ram body. The at least one channel is also to enable the second composite material to return to, at least in part, the integrated structure formed by such the method.

In at least one embodiment, a method for sealing of a ram body includes providing a seal that has an integrated structure of a first composite material and a second composite material in a ram body. The integrated structure is so that the first composite material has at least one channel and has the second composite material within the at least one channel. The method includes energizing the ram body having the seal. Movement is enabled for the second composite material within the at least one channel of the first composite material during energizing of a ram body. This is so that the at least one channel can enable the second composite material to return to, at least in part, the integrated structure of the seal.

BRIEF DESCRIPTION OF THE DRAWINGS

Various embodiments in accordance with the present disclosure will be described with reference to the drawings, in which:

FIG. 7 illustrates a process flow of a method for an example application of a seal having an integrated structure for a ram body according to at least one embodiment herein.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various other functions can be implemented within the various embodiments as well as discussed and suggested elsewhere herein. In at least an aspect, the present disclosure is to a seal having an integrated structure for use in a ram body in a BOP at a wellhead or in other wellsite equipment.

In at least one embodiment, a seal for a ram body includes an integrated structure of two elastomer components, forming a first and a second composite materials. In at least one embodiment, a first composite material includes a first elastomer of a high modulus of elasticity, while a second composite material includes a second elastomer of a low modulus of elasticity relative to a first composite material.

In at least one embodiment, a high modulus material (for a first composite material) may be described as a material having a first stiffness that may be associated with a tensile stress, at 50% strain, in the range of 2500 to 4500 pounds per square inch (psi). Such a first composite material may have a hardness of 90 to 105 Shore A on a Shore Hardness Scale. In at least one embodiment, a first composite material may be composed of a polymer from the group of nitrile butadiene rubber (NBR), hydrogenated nitrile butadiene rubber (HNBR), fluoroelastomer (FKM), neoprene rubber (CR), natural rubber (NR), epichlorohydrin rubber, and polyurethane rubber.

In at least one embodiment, a low modulus material (for a second composite material) may be described as a material having a second stiffness that may be associated with a tensile stress, at 50% strain, in the range of 500 to 1800 psi. Such a second composite material may have a hardness in the range of 65 to 85 Shore A on a Shore Hardness Scale. In at least one embodiment, a second composite material may be composed of a polymer from a group of nitrile butadiene rubber (NBR), hydrogenated nitrile butadiene rubber (HNBR), fluoroelastomer (FKM), neoprene rubber (CR), natural rubber (NR), epichlorohydrin rubber, and polyurethane rubber. In at least one embodiment, second composite material may further include an adhesive system to chemically bond such a low modulus material. In at least one embodiment, such an adhesive system includes a nitrogen-substituted aromatic and carbon black, with percentage of solids being 20-30% by weight.

Figure 1:
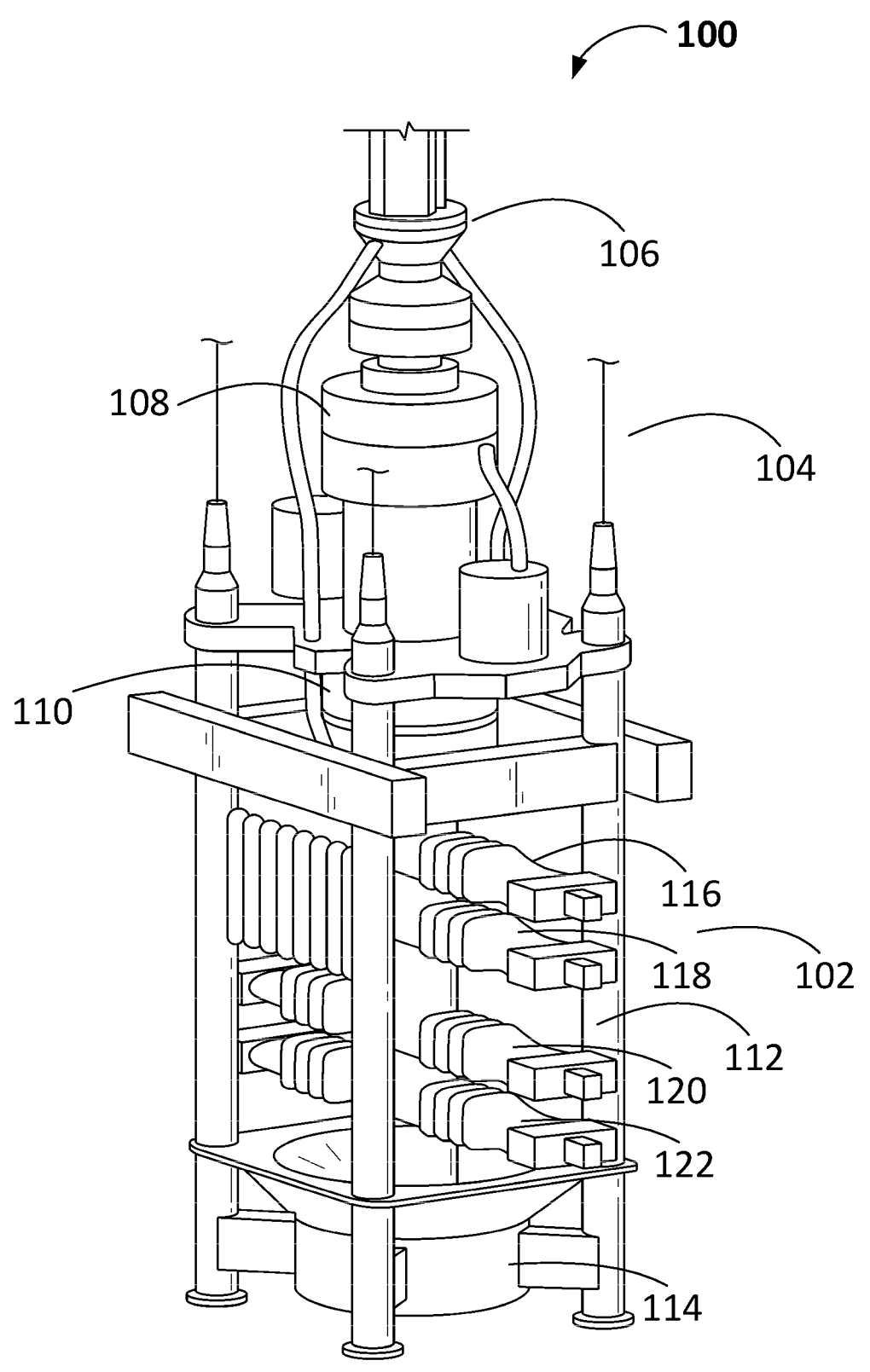
FIG. 1 illustrates an example blowout preventer (BOP) stack subject to improvements of at least one embodiment herein.

FIG. 1 illustrates an example blowout preventer (BOP) stack 100 subject to improvements described herein. A subsea BOP assembly may include a lower stack assembly 102 and an upper stack assembly 104 (or lower marine riser package (LMRP)). An upper stack assembly 104 can include, for example, a riser adapter 106, annular blowout preventers 108, 110, control pods, and choke and kill lines. A lower stack assembly 102 may include a frame 112 with a wellhead connector 114 at a lower end for connecting to a subsea wellhead assembly, and hydraulic accumulators. In an example, a bore may run through such a BOP assembly, including through such an upper and a lower stack assemblies 102, 104. Such a bore may include a pipe therein. In at least one embodiment, a shear ram housing 116 may be located above pipe ram housings 118, 120, 122 on a lower stack assembly 102.

In one example, a shear ram housing 116 may include shear upper and lower ram blocks attached to upper and lower blades, as illustrated in and described with reference to FIG. 2. In at least one embodiment, individual pipe ram housing 118, 120, 122 include pipe ram blocks with semi-circular recesses on their mating faces. Such semi-circular recesses allow for closing around different size ranges of pipes. In at least one embodiment, when open, shear and pipe ram blocks may be positioned on either side of a bore. In at least one embodiment, when closed, shear ram blades of associated shear ram blocks seal off a bore. In at least one embodiment, when a pipe is present in such a bore, provided shear ram blades will shear such a pipe.

Figure 2:
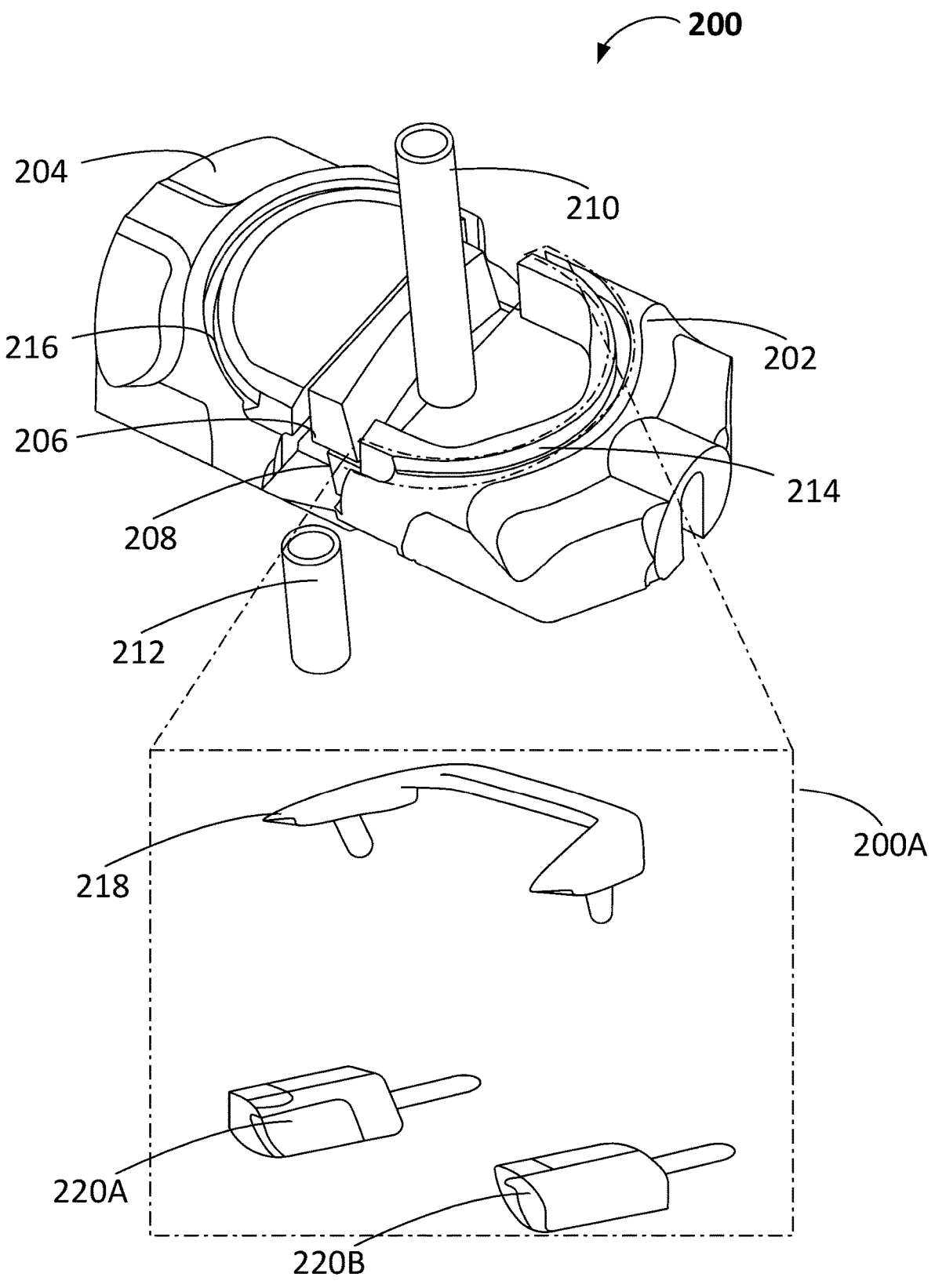
FIG. 2 illustrates an example ram body having ram blocks, ram blades, and a seal subject to improvements of at least one embodiment herein.

FIG. 2 illustrates an example shear ram body 200 having shear ram blocks 202, 204, shear ram blades 206, 208, and a seal 214, 216 subject to improvements of at least one embodiment herein. A seal may be referred to by two seal sections 214; 216, one on each shear ram block 202; 204. Such shear ram blocks are referred to as an upper shear ram block 204 and a lower shear ram block 206. A shear ram body 200 is illustrated as removed from a shear ram housing 116 and in a closed position. When such shear ram blocks 202, 204 are closed, such shear ram blades 206, 208 overlap, thereby shearing pipe 212 positioned between such shear ram blocks 202, 204 against a bore of a BOP. Furthermore, a seal 214, 216 (and in blown-up view 200A) subject to improvement of at least one embodiment herein may include a top packer 218 and side packers 220A, 22B for each seal section.

Figure 3:
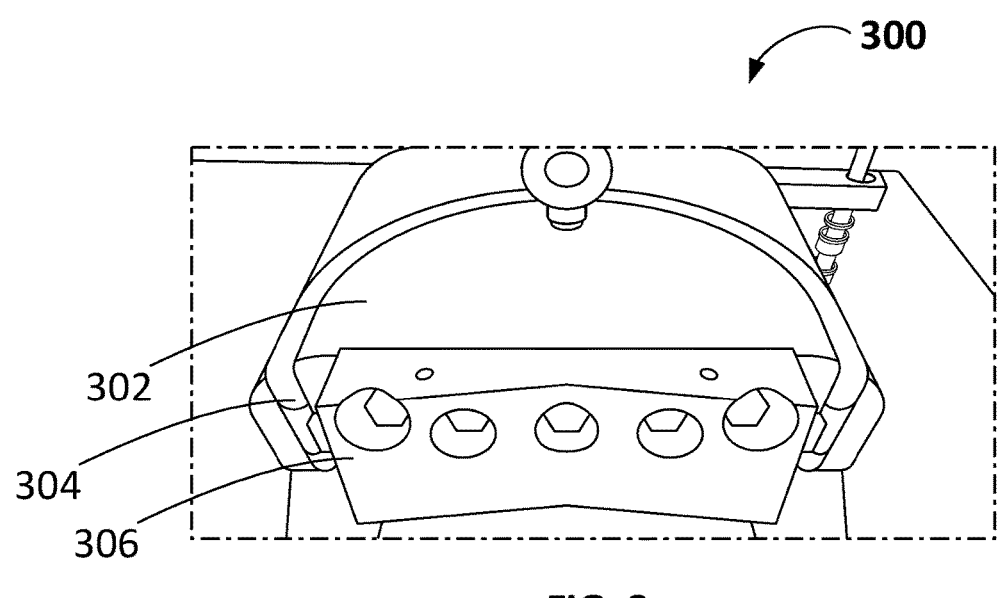
FIG. 3 illustrates an example a ram body having a seal with an integrated structure of at least one embodiment herein.

FIG. 3 illustrates an example of a ram body 300 having a seal with an integrated structure. Such a ram body may be a shear ram body or a pipe ram body. Therefore, a seal with an integrated structure may be used in shear rams as well as in pipe rams and other ram bodies for at least a BOP. A ram block 302 may be an upper or a lower ram block. A ram block 302 includes a seal or seal section 304 having an integrated structure and includes a blade 306, if a shear ram. In at least one embodiment, two seal sections form a seal for operation of a rams (either shear or pipe) within a ram housing.

Each seal section is referred to as a seal for being able to work independently, in a first ram block, against a different seal in a second ram block, with a first and a second ram block opposing each other for shear or pipe actions. A seal or seal section 304 may be associated with a ram block 302 by placement behind a ram blade 306. A seal or seal section 304, by its integrated structure, may not have a top packer that is detachable from associated with side packers as in FIG. 2.

Figure 4:
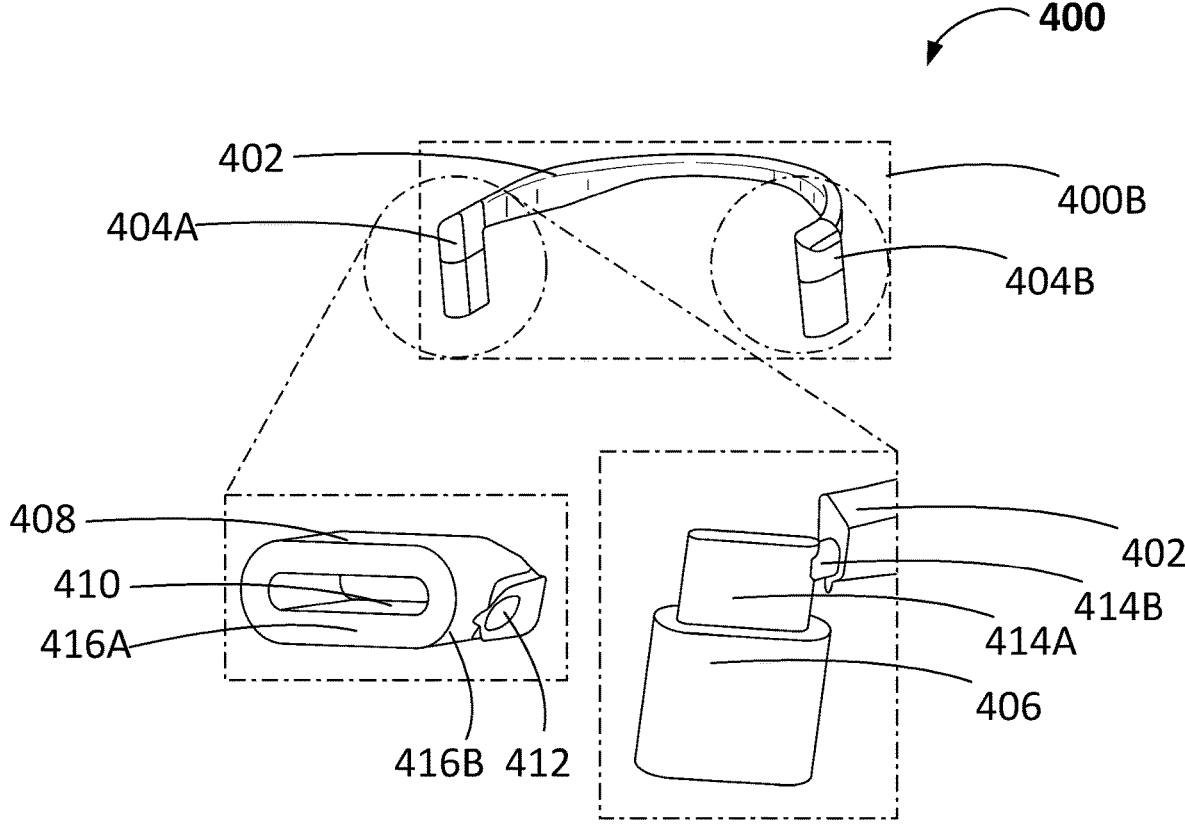
FIG. 4 illustrates an example seal having an integrated structure for a ram body according to at least one embodiment herein.

FIG. 4 illustrates an example seal 400 having an integrated structure for a ram body. Such a seal has a top seal section 402 formed integrally with side packer sections 404A, 404B. In at least one embodiment, a top seal section 402 and a bottom side packer section and a top side packer section (reference numerals 406, 414A) of each side packer sections 404A, 404B are made of a low modulus material representing a second composite material discussed herein. A top part (reference numeral 408) of each side packer sections 404A, 404B is made of a high modulus material representing a first composite material discussed herein.

Even though illustrated as separate parts (such as parts 402, 406, 408), a seal 400 for a ram body is an integrated structure having these separate parts formed together. As such, even though a blowup of a side packer section 404A, 404B is illustrated as having a distinct top part 408 of a first composite material from second composite material parts that make up substantially the rest of a seal 400, including a bottom side packer section and a top side packer section (reference numerals 406, 414A), an entirety of seal 400 is formed in an integrated structure. In at least one embodiment, a bottom side packer section 406 and a top side packer section 414A may be coupled to a top seal section 402 of a seal via a channel section 414B to allow a second composite material from a bottom side packer section to flow and to return to, at least in part, an integrated structure of such a seal.

An integrated structure for a seal 400 may be formed by a rubber or synthetic molding of multiple elastomers. Such a seal 400 includes an integrated structure of a first composite material 408 and a second composite material 402, 406. A first composite material 408 has at least one channel 410, 412 and has a second composite material 414A; 414B (forming a top side packer section and a channel section) within such at least one channel 410, 412. In at least one embodiment, such at least one channel 410, 412 is to allow movement therethrough of a second composite material parts 406, 414A during energizing of a ram body (such as ram body 300) hosting such a seal 400. Such at least one channel 410, 412 is also to allow return of a second composite material parts 406, 414A to, at least in part, an integrated structure formed of a first composite material and a second composite material, illustrated in block 400B.

As a ram body 300 is energized, stresses between ram blocks (such as an upper and a lower ram blocks) cause a second composite material to soften. To prevent extrusion of such seal material, a channel 410, 412 is provided in a first composite material that can withstand such stresses and that does not soften relative to a second composite material. The channel 410, 412 directs or allows flow or movement of a second composite material, as it softens, into other portions of a second composite material, such as moving towards a top seal section 402. Flow or movement of a second composite material may be enabled by stress or deformation forces experienced between ram blocks during energizing of a ram body.

One or more second composite material parts 406, 414A, flow through such a channel 410, 412 towards or onto other second composite material parts, such as parts 414B (referred to as channel section part), 402 (referred to as a top seal section). In at least one embodiment, once energizing of a ram body 300 is complete and till deenergizing occurs, such flow of a second composite material within a channel 410, 412 may be complete, may remain in its new place, and may include minor creeps as residual stresses may remain.

A channel 410, 412 in a first composite material is such that, upon deenergizing of a ram body, a second composite material returns back to at least second composite material parts 406, 414A, as it hardens. Such a return back to at least second composite material parts 406, 414A, along with a first composite material that does not soften as much relative to a second composite material, represents a return of a second composite material to, in part, an integrated structure of a seal 400 as originally enabled and installed.

In at least one embodiment, return of a second composite material to an integrated structure of a seal is substantially as to its original and installed geometry of a seal 400. Such an integrated structure is so that an original and installed geometry allows reuse of a seal 400. Therefore, after deenergizing a ram body 300, a seal 400 may be reused as its integrated structure, such as its geometry, remains substantially as original and substantially as installed for a first time. A seal 400 is so that, after deenergizing, it may be used for at least one second energizing of a ram body 300, based in part on a return of a second composite material to, at least in part, an integrated structure of a seal 400, following deenergizing of a ram body.

To support such features, a seal 400 includes a first stiffness for a first composite material that may be enabled by a high modulus material provided for this part of a seal 400. Such a seal 400 includes a second stiffness for a second composite material that may be enabled by a low modulus material (relative to a first composite material) provided for this part of a seal 400. As such, a first stiffness for a first composite material is more than a second stiffness of a second composite material.

In yet another example, a seal 400 includes at least one channel 410, 412 that extends through a bottom 416A of a first composite material 408 and through a side 416B of such a first composite material, where it forms at least one port on a side 416B and a bottom 416A of a seal 400. Therefore, at least one channel 410, 412 of a seal 400 may be internally connected to allow movement of a second composite material therethrough. The at least one port may allow the second composite material to extend through the at least one port into the at least one channel 410, 412. The at least one channel 410, 412 may be adapted to allow flow of a second composite material 406, from a side packer section to a top seal section of the seal and to allow the return of the second composite material to, at least in part, the integrated structure.

Figures 5A, 5B, 5C:
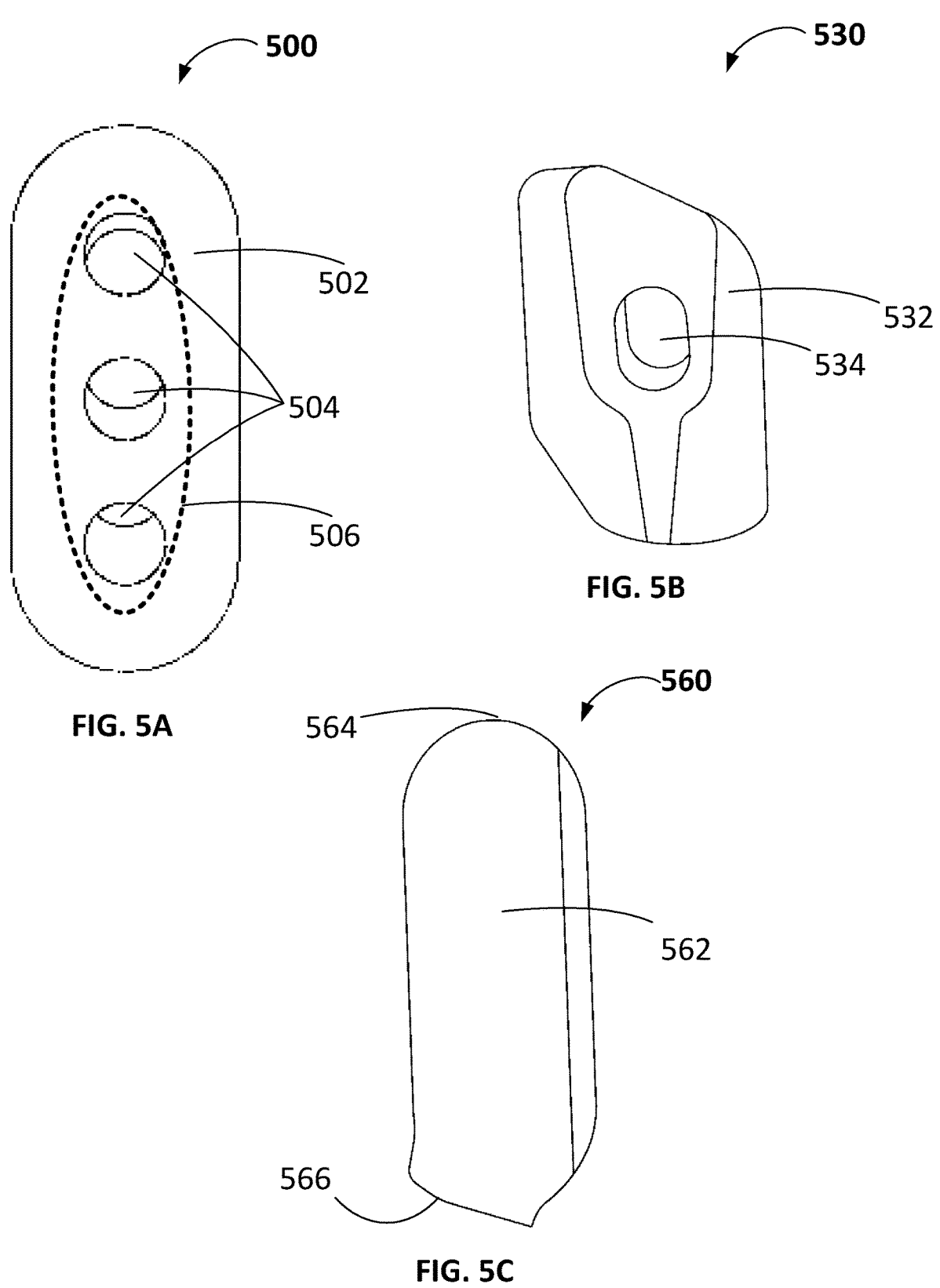
FIGS. 5A-C illustrate various views of a first composite material to be used in an integrated structure of a seal for a ram body according to at least one embodiment herein.

FIGS. 5A-C illustrate various views 500, 530, 560 of a first composite material of an integrated structure of a seal for a ram body. Such views and separation from an integrated structure of a seal are merely for purposes of clarity in at least a channel structure of a first composite material. FIG. 5A is a bottom view of a first composite material used in an integrated seal. At least one channel may include multiple smaller bottom channels 504 that are all internally connected to a side port 534 illustrated in a side view 530 (of FIG. 5B) of a first composite material.

A side of a first composite material that is facing away from a top seal section does not include any openings or ports as this side faces against an opposing seal of an opposing ram body. FIG. 5C illustrates this in a top view 560 of a first composite material. In at least one embodiment, a first side 564 faces away from a top seal section and is smooth and includes no openings or ports, while a second side 566 faces towards a top seal section and includes at least one port as part of at least one channel in a first composite material.

At least one channel, whether made of a single elongated bottom section 506 or of multiple bottom channels 506; 504, extends through a bottom of a first composite material to allow flow of a second composite material from a bottom side packer section to a top seal section of a seal. Such at least one channel further allows return of a second composite material to, at least in part, an integrated structure of a seal so that such a seal may be reused as its geometry remains substantially as original.

At least one channel herein includes a first channel 504; 506 extending through a bottom of a first composite material and through a side 532; 566 of a first composite material to allow flow of a second composite material from a bottom side packer section to a top seal section of a seal. Such at least one channel may be adapted to allow return of a second composite material to, at least in part, an integrated structure of a seal.

At least one channel 504; 506 may include a single elongated bottom section 506 extending along a width of an integrated structure and to comprise a margin section 502 of a first composite material to encompass sides of a top side packer section (such as top side packer section 414A) therein. Further, at least one channel of a first composite material may include a multiple bottom channels 504 extending through an integrated structure and may include margin sections 502 circumventing such multiple bottom channels 504 so that such margin sections encompass sides of at least one top side packer section therein.

A second integrated structure representing a seal of a second or opposing ram body may be made to abut an integrated structure of a first ram body during or after energizing of such ram bodies. In at least one embodiment, a second integrated structure may be adapted to support movement of a second composite material of an integrated structure through a first composite material as such a second integrated structure blocks extrusion of a second composite material in a direction other than through a first composite material. An action may be replicated in such a second integrated structure of a second or opposing ram body to prevent any extrusion from a ram housing having such ram bodies. In at least one embodiment, integrated structures of such seals used together may be to enable reuse of such seals for at least a second energizing of ram bodies based in part on return of respective second composite materials to, at least in part, integrated structures for respective seals.

Figure 6:
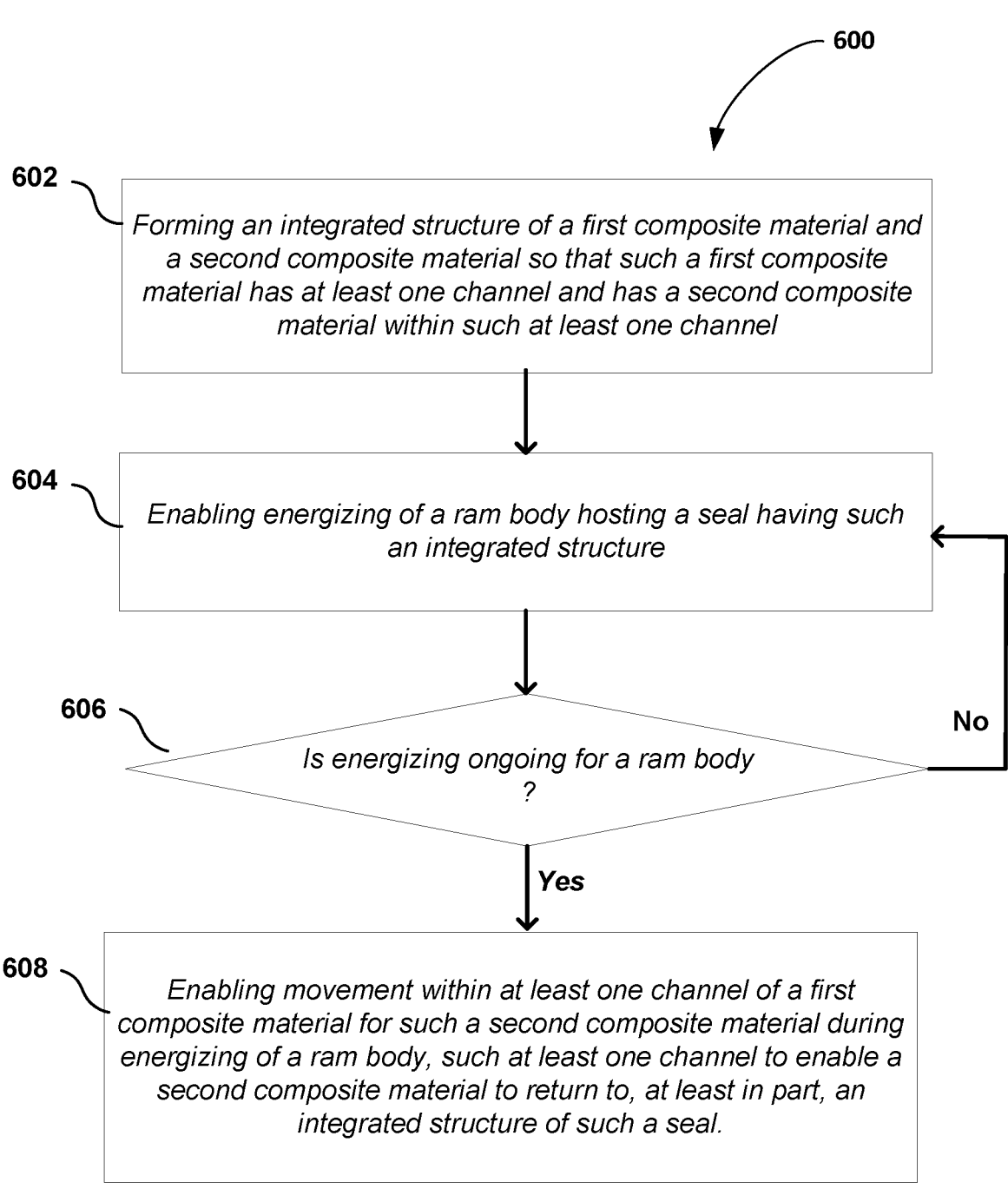
FIG. 6 illustrates a process flow of a method for a seal having an integrated structure and to be applied to a ram body according to at least one embodiment herein.

FIG. 6 illustrates a process flow of a method 600 for a seal having an integrated structure and to be applied to a ram body. Step 602 is for forming an integrated structure of a first composite material and a second composite material so that such a first composite material includes at least one channel and includes such a second composite material within such at least one channel. Step 604 is for enabling energizing of a ram body having such a seal. Step 604 may be supported by a sub-step of providing such a seal to a ram body that is to be disposed in a BOP operation. Step 604 may be supported further by a sub-step of providing opposing ram bodies having opposing seals, such opposing ram bodies to be engaged with each other.

Step 606 is for determining if energizing is ongoing for a ram body. Step 604 may be otherwise repeated to enable energizing of a ram body. Step 606 is for enabling movement within such at least one channel for such a second composite material during energizing of the ram body. At least one channel may be to enable a second composite material to return to, at least in part, an integrated structure of such a seal so that it may be reused in a second energizing performed for a ram body hosting such a seal.

FIG. 7 illustrates a process flow of a method 700 for an example application of a seal having an integrated structure for a ram body. Step 702 is for determining sealing requirements for a ram body or an application of a ram body. A feature may be supported by a further sub-step of determining pressures associated with a BOP at its application and materials (such as type of bore or pipe) to be used in a BOP. Step 704 is for machining, based at least in part on such sealing requirements, at least one channel for a first composite material to have a second composite material therein. In at least one embodiment, machining, such as in step 704, may include molding, drilling, or any other forming process for preparing a seal having an integrated structure and at least one channel through a first composite material for a second composite material therein. The method herein may be further supported by a sub-step of determining a first and a second elastomers to work under pressures or materials associated with a BOP.

In one example, following the machining feature of step 704, a verification step 706 determines that an integrated structure of a seal is formed. In at least one embodiment, step 704 may be repeated to achieve an intended integrated structure of a seal. Step 708 is for enabling association of an integrated structure of such a seal into a ram body. In at least one embodiment, this may be by decoupling a shear ram blade and by placing a seal in a provided space of a ram block before coupling a shear ram blade back to a shear ram block. Step 710 is for enabling movement, within at least one channel of a first composite material, for a second composite material during energizing of a ram body. Step 710 is enabled so that such at least one channel may allow a second composite material to return to, at least in part, an integrated structure of such a seal when a ram body is deenergized.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two, but can be more when so indicated either explicitly or by context. Further, unless stated otherwise or otherwise clear from context, phrases such as based on means based at least in part on and not based solely on.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

What is claimed is:

1. A seal for a ram body, the seal comprising:

an integrated structure of a first polymer composite material and a second polymer composite material, the first polymer composite material comprising:

at least one channel extending internally through the first polymer composite material between at least two ports, wherein the second polymer composite material extends into the at least one channel, and wherein, when the ram body is deenergized, the second polymer composite material is in an initial position within the at least one channel, and when the ram body is energized, the second polymer composite material is flowed in a second position extending through the at least one channel.

2. The seal of claim 1, further comprising:

a first stiffness for the first polymer composite material and a second stiffness for the second polymer composite material, the first stiffness being more than the second stiffness.

3. The seal of claim 1, further comprising:

the at least one channel to extend through a side of the first polymer composite material to allow flow of the second polymer composite material from a side packer section to a top seal section of the seal and to allow return of the second polymer composite material to, at least in part, the integrated structure.

4. The seal of claim 1, wherein the at least one channel extends through a bottom of the first polymer composite material to allow flow of the second polymer composite material from a bottom side packer section to a top seal section of the seal and to allow return of the second polymer composite material to, at least in part, the integrated structure.

5. The seal of claim 1, wherein the at least one channel comprises a first channel extending through a bottom of the first polymer composite material and through a side of the first polymer composite material to allow flow of the second polymer composite material from a bottom side packer section to a top seal section of the seal and to allow return of the second polymer composite material to, at least in part, the integrated structure.

6. The seal of claim 5, further comprising:

a bottom side packer section coupled to a top seal section of the seal via a channel section to allow the second polymer composite material from the bottom side packer section to flow and to return to, at least in part, the integrated structure.

7. The seal of claim 1, wherein the at least one channel comprises:

a single elongated bottom section to extend along a width of the integrated structure; and a margin section of the first polymer composite material encompassing sides of a top side packer section therein.

8. The seal of claim 1, wherein the at least one channel of the first polymer composite material comprises:

multiple bottom channels extending through the integrated structure; and margin sections circumventing the multiple bottom channels, the multiple bottom channels encompassing sides of at least one top side packer section therein.

9. The seal of claim 1, further comprising:

a second integrated structure abutting the integrated structure during or after the energizing of the ram body, the second integrated structure supporting the movement of the second polymer composite material of the integrated structure through the first polymer composite material.

10. The seal of claim 1, further comprising:

the integrated structure to enable reuse of the seal for at least a second energizing of the ram body based in part on the return of the second polymer composite material to, at least in part, the initial position.

11. The seal of claim 1, further comprising:

a high modulus material as the first polymer composite material, the high modulus material comprising one or more of:

a tensile stress, at 50% strain, of 2500 to 4500 pounds per square inch (psi);

a hardness of 90 to 105 Shore A on a Shore Hardness Scale; and a first polymer comprising two or more of nitrile butadiene rubber (NBR), hydrogenated nitrile butadiene rubber (HNBR), fluoroelastomer (FKM), neoprene rubber (CR), natural rubber (NR), epichlorohydrin rubber, polyurethane rubber, hydrogenated butadiene rubber, or fluoroelastomer.

12. The seal of claim 1, further comprising:

a low modulus material as the second polymer composite material, the low modulus material comprising one or more of:

a tensile stress, at 50% strain, of 500 to 1800 psi;

a hardness of 65 to 85 Shore A on the Shore Hardness Scale;

a second polymer comprising two or more of nitrile butadiene rubber (NBR), hydrogenated nitrile butadiene rubber (HNBR), fluoroelastomer (FKM), neoprene rubber (CR), natural rubber (NR), epichlorohydrin rubber, polyurethane rubber, nitrile butadiene rubber, hydrogenated butadiene rubber, or a fluoroelastomer; and a nitrogen-substituted aromatic and carbon black adhesive system, with 20-30% solids by weight.

13. A method for a seal to be applied to a ram body, the method comprising:

forming an integrated structure of a first polymer composite material and a second polymer composite material so that the first polymer composite material comprises at least one channel extending internally through the first polymer composite material between at least two ports and comprises the second polymer composite material within the at least one channel in an initial position; and enabling movement, within the at least one channel, for the second polymer composite material to flow into the at least one channel extending internally through the first polymer composite material during energizing of the ram body, and for the second polymer composite material to return to, at least in part, the initial position during deenergizing of the ram body.

14. The method of claim 13, further comprising:

enabling a first stiffness for the first polymer composite material; and enabling a second stiffness for the second polymer composite material, the first stiffness being more than the second stiffness.

15. The method of claim 13, further comprising:

enabling the at least one channel to extend through a side of the first polymer composite material to allow flow of the second polymer composite material from a side packer section to a top seal section of the seal; and enabling, using the at least one channel, the return of the second polymer composite material to, at least in part, the integrated structure.

16. The method of claim 13, further comprising:

enabling the at least one channel to extend through a bottom of the first polymer composite material to allow flow of the second polymer composite material from a bottom side packer section to a top seal section of the seal; and enabling, using the at least one channel, the return of the second polymer composite material to, at least in part, the integrated structure.

17. The method of claim 13, further comprising:

enabling the at least one channel to comprise a single elongated bottom section extending along a width of the integrated structure; and enabling the at least one channel to comprise a margin section of the first polymer composite material to encompass sides of a top side packer section therein.

18. A method for sealing of a ram body, the method comprising:

providing a seal comprising an integrated structure of a first polymer composite material and a second polymer composite material in the ram body, the first polymer composite material comprising at least one channel extending internally through the first polymer composite material between at least two ports and the second polymer composite material within the at least one channel in an initial position;

energizing the ram body, wherein during energizing, the second polymer composite material flows into the at least one channel extending internally through the first polymer composite material.

19. The method of claim 18, further comprising:

providing a second integrated structure in the ram body, the second integrated structure to abut the integrated structure during or after the energizing of the ram body; and enabling the second integrated structure to support the movement of the second polymer composite material of the integrated structure through the first polymer composite material.

20. The method of claim 18, further comprising:

deenergizing the ram body, wherein during deenergizing, the second polymer composite material returns, at least in part, to the initial position; and reusing the integrated structure of the seal for at least a second energizing of the ram body based in part on the return of the second polymer composite material to, at least in part, the integrated structure following the deenergizing of the ram body.

* * * * *